United States Patent [19]

Adamski

[11] 4,076,095
[45] Feb. 28, 1978

[54] PEDAL LOCKING DEVICE

[76] Inventor: Richard Adamski, 293 Yasemite Drive, Pittsburgh, Pa. 15235

[21] Appl. No.: 720,149

[22] Filed: Sep. 3, 1976

[51] Int. Cl.² .............................................. G05G 5/00
[52] U.S. Cl. ........................................ 180/114; 70/14; 70/199; 70/202; 70/204; 70/237
[58] Field of Search ................. 70/198, 199, 200, 201, 70/202, 203, 204, 237, 238, 192, 211, 212, 19, 14; 180/114, 90.6

[56] References Cited

U.S. PATENT DOCUMENTS

| | | | |
|---|---|---|---|
| 1,215,837 | 2/1917 | Needham | 70/200 |
| 1,222,456 | 4/1917 | Peake | 70/199 |
| 1,343,807 | 6/1920 | Berryhill | 70/199 |
| 1,371,886 | 3/1921 | Gage | 70/203 |
| 1,421,021 | 6/1922 | Miller | 70/200 |
| 1,442,203 | 1/1923 | Williams et al. | 70/202 |
| 1,444,935 | 2/1923 | Mokracek | 70/200 |
| 2,963,896 | 12/1960 | Hoffman | 180/114 X |
| 3,631,694 | 1/1972 | Teroux | 70/202 |
| 3,757,549 | 9/1973 | Mullis | 70/211 X |
| 3,968,665 | 7/1976 | Kaufmann | 70/203 X |

FOREIGN PATENT DOCUMENTS

| | | | |
|---|---|---|---|
| 602,103 | 3/1926 | France | 70/200 |
| 1,383,641 | 2/1975 | United Kingdom | 70/237 R |

*Primary Examiner*—Roy D. Frazier
*Assistant Examiner*—Rodney H. Bonck
*Attorney, Agent, or Firm*—Robert D. Yeager; Robert DeMajistre

[57] ABSTRACT

A locking device for the pedals of a motor vehicle is comprised of a first rigid support with a first rigid bar mounted at one end to the first support and perpendicular thereto. A second rigid bar is mounted at one end thereof to the first rigid support and in spaced relation and parallel to the first rigid bar. A second rigid support is mounted to the other end of the first and second rigid bar and parallel to the first support. At least and preferably one of the above elements are positionably removable. A locking means is provided to lock the positionably removable element or elements and fix the position of the structure.

3 Claims, 4 Drawing Figures

PEDAL LOCKING DEVICE

BACKGROUND OF THE INVENTION

1. Field of the Invention

This invention relates to locking devices for motor vehicles and more particularly to a locking device for the pedals of a motor vehicle.

2. Description of the Prior Art

"Motor vehicles" as used herein refers to trucks and automobiles having at least brake and gas pedals and which also may have a clutch pedal. Motorcycles and similar vehicles are excluded from the scope of this invention.

Security devices for theft prevention of motor vehicles have taken many forms. Door locks, burglar alarms, pedal locks, secondary ignition switches and the like have been used with both greater and lesser degrees of effectiveness in theft prevention. Locking devices for the pedals of a motor vehicle have been proposed as effective in preventing unauthorized use of such vehicles. However many of these devices are mechanically complicated and in many instances easily circumvented. Illustrative of pedal locking devices are those disclosed in U.S. Pat. Nos. 3,690,131; 1,792,990; 1,449,769; 1,495,700 and 1,271,941.

In accordance with the present invention a pedal locking device is provided which is easily installed, inexpensive to manufacture and particularly effective in preventing the theft of a motor vehicle.

BRIEF DESCRIPTION OF THE INVENTION

A locking device for the pedals of a motor vehicle is comprised of a first rigid support with a first rigid bar mounted at one end to the first support and perpendicular thereto. A second rigid bar is mounted at one end thereof to the first rigid support and in spaced relation and parallel to the first rigid bar. A second rigid support is mounted to the other end of the first and second rigid bar and parallel to the first support. At least and preferably one of the above elements are positionably removable. A locking means is provided to lock the positionably removable element or elements and fix the position of the structure.

The invention will be further illustrated by the following drawings.

DETAILED DESCRIPTION OF THE DRAWINGS

Figure 1:
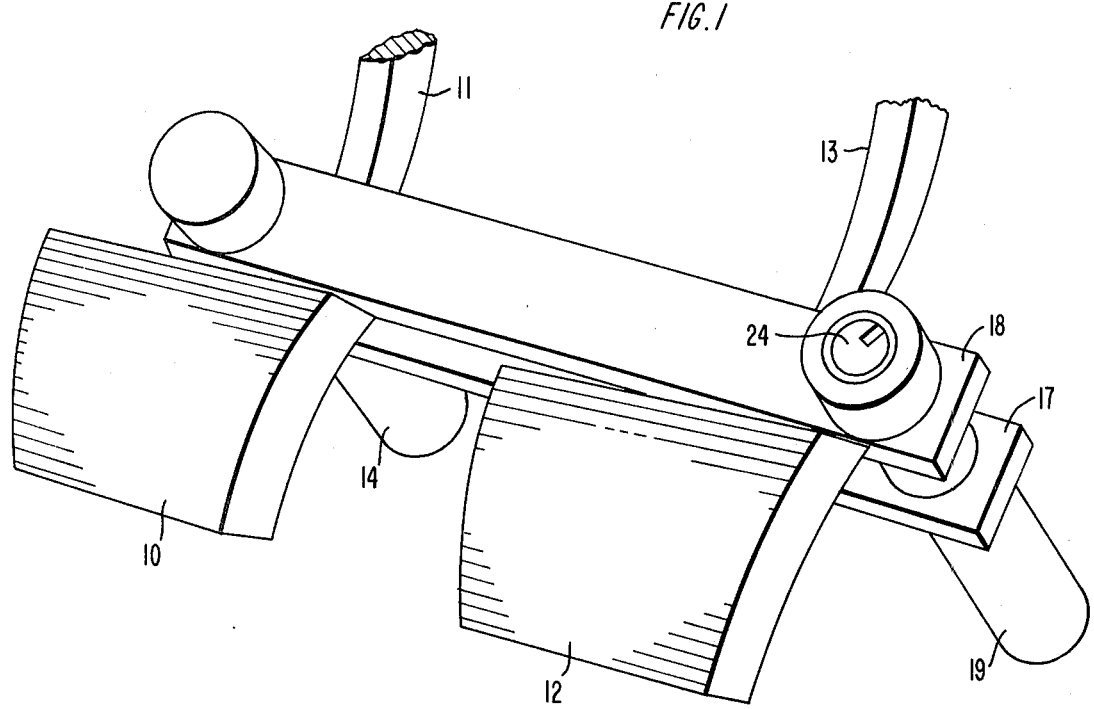
FIG. 1 is as a perspective view of one embodiment of the invention.
Figure 2:
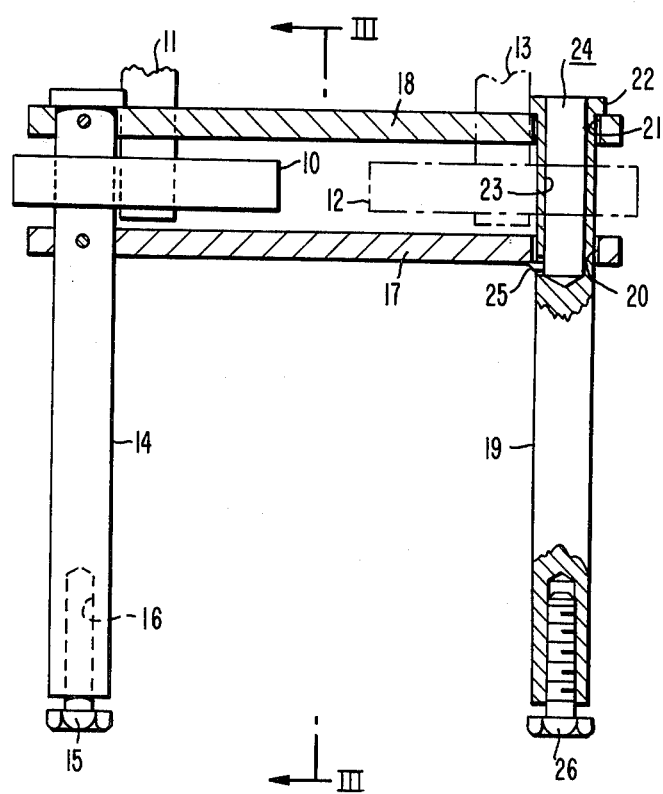
FIG. 2 is a front view partially in section of the embodiment shown in FIG. 1.
Figure 3:
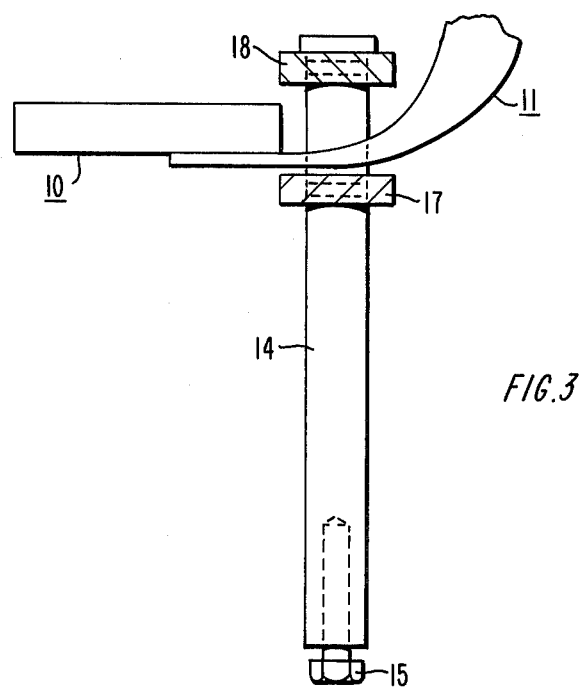
FIG. 3 is a side view partially in section taken across the III—III line of FIG. 2; and, FIG. 4 is a front view of a second embodiment of the invention.

FIGS. 1 through 3 show a device for locking the brake and clutch pedal of a motor vehicle. However, the structure shown can be laterally reduced to lock either the clutch or brake pedal alone.

Referring now to FIGS. 1 through 3, clutch pedal 10 is connected to clutch actuating arm 11. The clutch itself is in the engaged position thus placing the clutch pedal 10 at its highest from the floor of the vehicle. Brake pedal 12 is connected to brake actuating arm 13. The brake itself is disengaged thus placing the brake pedal 12 at its highest from the floor of the vehicle. The pedals 10 and 12 and the arms 11 and 13 are generally parallel to each other. A first rigid support 14 is positioned generally perpendicular with the floor of the vehicle. Adjusting screw 15 is provided to adequately space support 14 from the floor in relation to pedals 10 and 13. A spacer may be provided in the threaded receiving portion 16 of support 14 to fix the length of travel of adjusting screw 15.

A first rigid bar 17 is permanently mounted to the first support 14 in this embodiment; the mounting is made by pinning the bar to the support. However, any other suitable means such as welding or the like may be used to permanently mount the support 14 to the bar 17. A second rigid bar 18 is permanently mounted to support 14 in a manner as previously described. Rigid bar 18 is parallel to bar 17 and in spaced relation thereto. The spacing of bars 17 and 18 is sufficient to allow arms 11 and 13 to pass therethrough while preventing pedals 10 and 12 from passing through the spacing.

A second rigid support 19 is removably mounted through apertures 20 and 21 in bars 17 and 18 respectively. Cap portion 22 in support 19 is provided to prevent support 19 from traversing apertures 20 and 21. Support 19 also has a space 23 bored therein which houses a lock 24. The lock 24 is preferably a barrel lock with the locking pin 25 engaging bar 17 to fix the position of the various parts of the device with relation to each other. Also associated with support 19 is adjusting screw 26 to space the bar 17 properly from the floor of the vehicle.

In operation, the integral structure, comprised of the support 14, and the bars 17 and 18, is inserted so that the arms 11 and 12 are between bars 17 and 18. The support 19 is inserted through apertures 20 and 21 and locked in position by locking pin 25 of lock 24. Adjusting screws 15 and 26 are adjusted to assure a snug fit between arms 11 and 13 and bar 17. To remove the locking device, the lock 24 is unlocked depressing pin 25 and allowing support 19 to be withdrawn from the device.

Although the embodiment shown in FIGS. 1 through 3 shows the support 19 as the locking removable element, the other elements of the device may be alternately lockable and removable so long as the final structure in its fixed operative position maintains the desired configuration.

The material of construction of the locking device is preferably aluminum or stainless steel. Other rigid materials may be used provided they are sufficiently rigid and not easily bent or cut.

Figure 4:
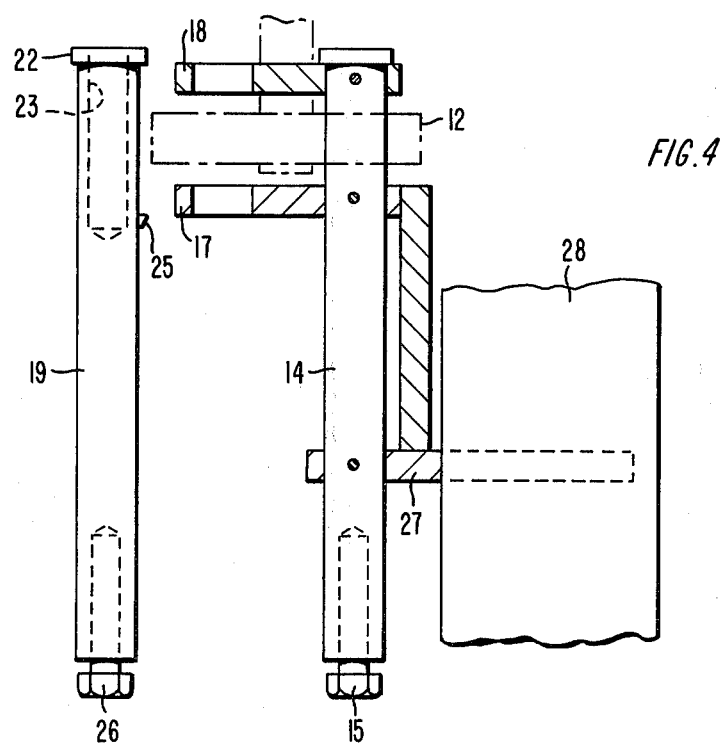

Referring now to FIG. 4 a second embodiment of the invention is shown which is adapted to lock the brake and gas pedal of a motor vehicle. The structure shown in FIG. 4 is the same as is shown in FIGS. 1 through 3 except for the distance between supports 14 and 19 and extending member 27. The supports 14 and 19 are spaced to lock only the brake pedal and bars 17 and 18 are shortened to accommodate such spacing. Extending member 27 is secured to support 14 by pinning or a similar method to provide sufficient rigidity. Extending member 27 fits under gas pedal 28 when the gas pedal 28 is at its maximum height from the vehicle's floor. Extending member 27 is parallel to the first and second rigid bars.

The operation and installation of the embodiment shown in FIG. 4 is similar to that of the embodiment previously described except the extending member is positioned to prevent the depression of the gas pedal 28.

As can be readily observed, there are a plurality of variations of the locking device of the invention. The device may be constructed to lock only the clutch pedal or brake pedal, both the clutch pedal and brake pedal or the brake pedal and accelerator pedal. Thus although the invention has been described with reference to specific configurations, it is only to be limited as is set forth in the accompanying claims.

What is claimed is:

1. In a motor vehicle having a floor with operational pedals including a brake pedal with actuating arms proximate to said floor, the improvement comprising a removable locking device for at least one of said operational pedals comprised of:
    a. a first rigid support in contact with the floor of the motor vehicle and generally perpendicular thereto;
    b. a first rigid bar permanently mounted on one end thereof along said support and perpendicular thereto;
    c. a second rigid bar permanently mounted at one end thereof along said first support, parallel to said first rigid bar and in spaced relation thereto, to allow the brake actuating arm to pass between said first and second bar and to prevent passage of the brake pedal between said first and second bar, said rigid bars being in spaced relation from said floor;
    d. apertures in each of said rigid bars at the other end thereof;
    e. a second rigid support in contact with the floor of said motor vehicle and generally perpendicular thereto, said second rigid support removably mounted to the other end of said first and second rigid bars through said apertures and said second support parallel to said first support; said first and second supports maintaining the position of said first and second bars to prevent downward travel of the brake pedal; and,
    f. means for locking said second rigid support in said apertures in the first and second rigid bars.

2. The device of claim 1 which includes an extending member parallel to said rigid bars to prevent the downward travel of the accelerator pedal.

3. The device of claim 1 wherein said rigid supports are adjustable in length.

* * * * *